United States Patent
Ueno et al.

(10) Patent No.: US 10,619,581 B2
(45) Date of Patent: Apr. 14, 2020

(54) CONTROL DEVICE OF INTERNAL-COMBUSTION ENGINE

(71) Applicant: Honda Motor Co., Ltd., Tokyo (JP)

(72) Inventors: Masaki Ueno, Saitama (JP); Noritaka Kimura, Saitama (JP); Kosuke Ihara, Saitama (JP); Yuto Katori, Saitama (JP); Yosuke Yamada, Saitama (JP); Hajime Uto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 15/910,011

(22) Filed: Mar. 2, 2018

(65) Prior Publication Data

US 2018/0266341 A1 Sep. 20, 2018

(30) Foreign Application Priority Data

Mar. 17, 2017 (JP) ................................ 2017-052270

(51) Int. Cl.
*F02D 41/00* (2006.01)
*F02M 26/06* (2016.01)
(Continued)

(52) U.S. Cl.
CPC ....... *F02D 41/005* (2013.01); *F02D 41/0007* (2013.01); *F02D 41/14* (2013.01);
(Continued)

(58) Field of Classification Search
CPC .... F02D 41/0007; F02D 41/005; F02D 41/14; F02D 41/18; F02D 2041/1431;
(Continued)

(56) References Cited

U.S. PATENT DOCUMENTS

| 2018/0238275 | A1* | 8/2018 | Minami | ................ F02D 41/005 |
| 2018/0245522 | A1* | 8/2018 | Yamashita | ............ F02B 75/041 |
| 2018/0245528 | A1* | 8/2018 | Kobara | .................... F02D 21/08 |

FOREIGN PATENT DOCUMENTS

| JP | 2005083362 | 3/2005 |
| JP | 2006144692 | 6/2006 |

(Continued)

OTHER PUBLICATIONS

"Office Action of Japan Counterpart Application," with partial English translation thereof, dated Aug. 21, 2018, p. 1-p. 8.

*Primary Examiner* — Patrick D Maines
*Assistant Examiner* — Dapinder Singh
(74) *Attorney, Agent, or Firm* — JCIPRNET

(57) ABSTRACT

A control device of an internal-combustion engine capable of improving merchantability by promptly and appropriately securing an in-cylinder fresh air amount even when an internal-combustion engine including a boost device and an EGR device is in a transient operation state is provided. A control device 1 includes an ECU 2. The ECU 2 calculates an intake air amount GGAScyl, sets an upper-limit target fresh air amount GAIR_hisH, controls a boost operation of a boost device 7 when an operating range of an internal-combustion engine 3 is in a predetermined boost range, and controls an EGR device 5 so that exhaust gas recirculation is stopped when the intake air amount GGAScyl does not reach an upper-limit target fresh air amount GAIR_hisH and the exhaust gas recirculation is executed when the intake air amount GGAScyl reaches the upper-limit target fresh air amount GAIR_hisH in the predetermined boost range.

3 Claims, 13 Drawing Sheets

(51) Int. Cl.
*F02D 41/14* (2006.01)
*F02D 41/18* (2006.01)

(52) U.S. Cl.
CPC .............. *F02D 41/18* (2013.01); *F02M 26/06* (2016.02); *F02D 2041/1431* (2013.01); *F02D 2041/1432* (2013.01); *F02D 2200/04* (2013.01); *F02D 2200/0406* (2013.01); *F02D 2200/0411* (2013.01)

(58) Field of Classification Search
CPC ......... F02D 2041/1432; F02D 2200/04; F02D 2200/0406; F02D 2200/0411; F02M 26/06
USPC ........................................................ 60/605.2
See application file for complete search history.

(56) References Cited

FOREIGN PATENT DOCUMENTS

| | | |
|---|---|---|
| JP | 2010249078 | 11/2010 |
| JP | 5672417 | 2/2015 |
| JP | 2017040212 | 2/2017 |

\* cited by examiner

CONTROL DEVICE OF INTERNAL-COMBUSTION ENGINE

CROSS-REFERENCE TO RELATED APPLICATION

This application claims the priority benefit of Japan application serial no. 2017-052270, filed on Mar. 17, 2017. The entirety of the above-mentioned patent application is hereby incorporated by reference herein and made a part of this specification.

BACKGROUND

Technical Field

The disclosure relates to a control device of an internal-combustion engine including a boost device and an EGR device.

Description of Related Art

Hitherto, as a control device of an internal-combustion engine, a device disclosed in Patent Document 1 has become known. An internal-combustion engine is mounted on a vehicle as a power source and includes a turbocharger and an EGR device. In this control device, boost control is executed by controlling an opening degree of a waste gate valve of the turbocharger when an operating range of the internal-combustion engine is in a boost range, and EGR control is executed by controlling an opening degree of an EGR valve of the EGR device when the operating range of the internal-combustion engine is in an exhaust gas recirculation requiring range.

At that time, when the EGR control needs to be started in a case where an operating range of the internal-combustion engine is in the boost range, a change in EGR rate of an intake system at a first predetermined position (a position of a throttle valve) with a change in opening degree of the EGR valve is estimated and the opening degree of the waste gate valve is controlled based on the estimation result. Specifically, when the EGR control is started in a case where the internal-combustion engine is in the boost range in a normal operation state, the waste gate valve is controlled such that it is closed at a timing after a response time Δt1 has elapsed from a valve opening timing of the EGR valve (see paragraphs [0020] to [0027] and FIG. 2 of the same document).

[Patent Document 1] Japanese Patent No. 5672417

In general, a turbocharger generally has a response delay characteristic. For that reason, when a target value of an amount of fresh air to be sucked into a cylinder changes and a target boost pressure corresponding to a target for a boost pressure changes in a state where the internal-combustion engine is in a transient operation state, a delay occurs before an actual boost pressure reaches the target boost pressure. In contrast, in the case of the control method disclosed in Patent Document 1, a control of the waste gate valve is started at a timing later than the valve opening timing of the EGR valve at the time of starting the EGR control in the boost range. For this reason, since a recirculation gas flows into the cylinder at a timing earlier than that for fresh air, it takes time until the amount of fresh air sucked into the cylinder reaches the target value. As a result, since there is a delay in response to boost, that is, there is a delay in response in generated torque, marketability deteriorates. Further, in the following description, the amount of the fresh air sucked into the cylinder will be referred to as an "in-cylinder fresh air amount".

The invention is contrived to solve the above-described problems and one or some exemplary embodiments of the invention provide a control device of an internal-combustion engine in which marketability is able to be improved due to an appropriate in-cylinder fresh air amount being promptly secured even when an internal-combustion engine including a boost device and an EGR device is in a transient operation state.

SUMMARY

One or some exemplary embodiments of the invention provide a control device of an internal-combustion engine, the internal-combustion engine including a boost device and an EGR device, the control device including: an intake gas amount acquiring unit which acquires an amount of a gas flowing into a cylinder of the internal-combustion engine as an intake gas amount; a target fresh air amount setting unit which sets a target fresh air amount GAIRcmd corresponding to a target for an in-cylinder fresh air amount which is an amount of fresh air flowing into the cylinder of the internal-combustion engine; a boost control unit which controls a boost operation of the boost device when an operating range of the internal-combustion engine is in a predetermined boost range; and an EGR control unit which controls the EGR device so that exhaust gas recirculation is stopped when the intake gas amount does not reach a target fresh air amount and the exhaust gas recirculation is executed when the intake gas amount reaches the target fresh air amount in a case where the operating range of the internal-combustion engine is in the predetermined boost range.

BRIEF DESCRIPTION OF THE DRAWINGS

FIG. 11(a) is a timing chart at the time of starting boost control while EGR control is stopped, FIG. 11(b) is a timing chart at the time of starting EGR control and boost control at the same time, and FIG. 11(c) is a timing chart at the time of starting EGR control at a timing at which an in-cylinder fresh air amount reaches a target fresh air amount after boost control starts.

DESCRIPTION OF THE EMBODIMENTS

Figure 1:
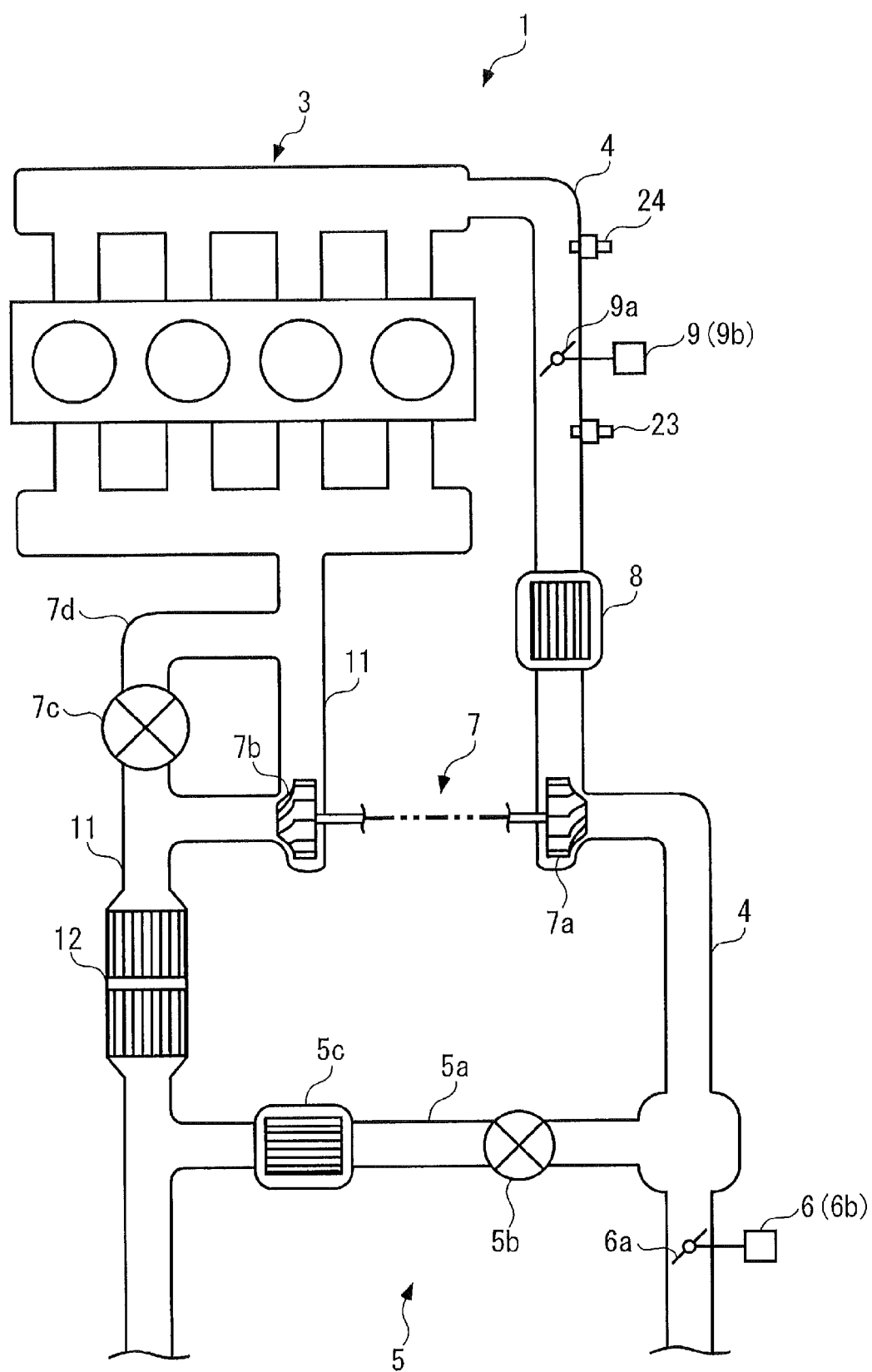
FIG. 1 is a diagram schematically showing a configuration of a control device according to a first embodiment of the invention and an internal-combustion engine adopting the control device.

According to the control device of the internal-combustion engine, the amount of the gas flowing into the cylinder of the internal-combustion engine is acquired as the intake gas amount, the target fresh air amount corresponding to the target for the in-cylinder fresh air amount which is the amount of the fresh air flowing into the cylinder of the internal-combustion engine is set. When the operating range of the internal-combustion engine is in the predetermined boost range, the boost operation of the boost device is controlled. Then, the EGR device is controlled so that the exhaust gas recirculation is stopped when the intake gas amount does not reach the target fresh air amount and the exhaust gas recirculation is executed when the intake gas amount reaches the target fresh air amount in a case where the operating range of the internal-combustion engine is in the predetermined boost range. In this way, when the exhaust gas recirculation is stopped, the intake gas amount is the same as the in-cylinder fresh air amount. Thus, since the boost operation of the boost device is executed while the exhaust gas recirculation is stopped when the intake gas amount does not reach the target fresh air amount even when the internal-combustion engine is in a transient operation state and the target fresh air amount changes, the intake gas amount, that is, the in-cylinder fresh air amount can promptly reach the target fresh air amount. As a result, since it is possible to promptly and appropriately secure the in-cylinder fresh air amount even when the internal-combustion engine is in a transient operation state differently from Patent Document 1, it is possible to improve boost responsiveness, that is, a responsiveness of generated torque. As a result, it is possible to improve the merchantability.

The invention according to claim 2 provides the control device of the internal-combustion engine according to claim 1, wherein the boost device 7 includes a compressor 7a which is provided in an intake passage 4 of the internal-combustion engine 3 and a turbine 7b which is provided in an exhaust passage 11 of the internal-combustion engine 3, wherein the EGR device 5 includes an EGR passage 5a which is connected between a downstream portion in relation to the turbine 7b of the exhaust passage 11 and an upstream portion in relation to the compressor 7a of the intake passage 4, an EGR valve 5b which changes an amount of a recirculation gas flowing inside the EGR passage 5a, and a differential pressure generating valve 6a which is provided at an upstream side in relation to a connection portion between the intake passage 4 and the EGR passage 5a and generates a differential pressure between upstream and downstream sides of the EGR valve 5b, and wherein when the intake gas amount GGAScyl reaches the target fresh air amount GAIRcmd, the EGR control unit controls the EGR valve 5b so that the recirculation gas flows inside the EGR passage 5a and controls the differential pressure generating valve 6a such that a differential pressure is generated.

According to the control device of the internal-combustion engine, the EGR device includes the EGR passage which is connected between the downstream portion in relation to the turbine of the exhaust passage and the upstream portion in relation to the compressor of the intake passage, the EGR valve which changes the amount of the recirculation gas flowing inside the EGR passage, and the differential pressure generating valve which is provided at the upstream side in relation to the connection portion between the intake passage and the EGR passage and generates the differential pressure between the upstream and downstream sides of the EGR valve. With this configuration, when the recirculation gas is recirculated to the intake passage by the EGR device, the EGR valve should be opened and the differential pressure generating valve needs to generate a differential pressure. In contrast, according to the control device, when the intake gas amount reaches the target fresh air amount, the EGR valve is controlled so that the recirculation gas flows inside the EGR passage and the differential pressure generating valve is controlled such that a differential pressure is generated. Accordingly, it is possible to reliably start the introduction of the recirculation gas at a timing at which the intake gas amount, that is, the in-cylinder fresh air amount reaches the target fresh air amount. As a result, it is possible to obtain a fuel saving effect by the introduction of the recirculation gas while securing high-level boost responsiveness when the internal-combustion engine is in a transient operation state.

The invention according to claim 3 is the control device of the internal-combustion engine according to claim 2, wherein the target fresh air amount setting unit sets a basic target fresh air amount (a target fresh air amount GAIRcmd) and an upper-limit target fresh air amount GAIR_hisH larger than the basic target fresh air amount (the target fresh air amount GAIRcmd) by a predetermined value DGAIR as a target fresh air amount GAIRcmd (step 2, 50), the EGR control unit controls the EGR device 5 so that the exhaust gas recirculation is stopped until the intake gas amount GGAScyl reaches the upper-limit target fresh air amount GAIR_hisH and the exhaust gas recirculation is executed after the intake gas amount GGAScyl reaches the upper-limit target fresh air amount GAIR_hisH when the operating range of the internal-combustion engine 3 is in a predetermined boost range. The predetermined value DGAIR is set to a value preventing a problem in which the intake gas amount GGAScyl becomes smaller than the basic target fresh air amount (the target fresh air amount GAIRcmd) when the control of the differential pressure generating valve 6a is executed.

As in the invention according to claim 2, when a condition of starting and stopping the control of the EGR valve and the differential pressure generating valve is set depending on whether the intake gas amount reaches the target fresh air amount, the amount of the air flowing inside the intake passage decreases with the start of the control of the differential pressure generating valve. Accordingly, there is a possibility that the in-cylinder fresh air amount may be temporarily smaller than the target fresh air amount. In that case, there is a possibility that the opening degree of the differential pressure generating valve may continuously and repeatedly increase and decrease, that is, hunting may occur. On the contrary, according to the control device of the internal-combustion engine, the basic target fresh air amount and the upper-limit target fresh air amount larger than the basic target fresh air amount by a predetermined value are set as the target fresh air amount. Then, when the operating range of the internal-combustion engine is in the predetermined boost range, the EGR device is controlled so that the exhaust gas recirculation is stopped until the intake gas amount reaches the upper-limit target fresh air amount and the exhaust gas recirculation is executed after the intake gas amount reaches the upper-limit target fresh air amount. In this case, since the predetermined value is set to a value in which the intake gas amount does not become smaller than the basic target fresh air amount when the control of the differential pressure generating valve is executed, the basic target fresh air amount is set to the in-cylinder fresh air amount requested at that time point. Accordingly, since it is possible to secure the required in-cylinder fresh air amount while avoiding the occurrence of the above-described hunting after the start of the control of the EGR device, it is possible to further improve the merchantability.

The invention according to claim 4 is the control device of the internal-combustion engine according to claim 2, wherein the EGR control unit controls an opening degree LPTH of the differential pressure generating valve 6a to a maximal opening degree LPTHwot in which no differential pressure is generated until the intake gas amount GGAScyl reaches the target fresh air amount GAIRcmd.

According to the control device of the internal-combustion engine, since the opening degree of the differential pressure generating valve is controlled such that it becomes the maximal opening degree in which no differential pressure is generated when the intake gas amount does not reach the target fresh air amount, it is possible to prevent a problem in which the differential pressure generating valve serves as a flow resistance during the operation of the boost device and to secure a high-level boost responsiveness.

The invention according to claim 5 is the control device of the internal-combustion engine according to claim 2, wherein the EGR control unit controls the opening degree of the differential pressure generating valve 6a such that it has a predetermined standby opening degree until the intake gas amount GGAScyl reaches the target fresh air amount GAIRcmd, and the predetermined standby opening degree is set to a value larger than the effective opening degree of the differential pressure generating valve 6a and smaller than the maximal opening degree LPTHwot in which no differential pressure is generated.

According to the control device of the internal-combustion engine, the opening degree of the differential pressure generating valve is controlled such that it has the predetermined standby opening degree when the intake gas amount does not reach the target fresh air amount and the predetermined standby opening degree is set to a value larger than the effective opening degree of the differential pressure generating valve and smaller than the maximal opening degree in which no differential pressure is generated. For this reason, since it is possible to prevent a problem in which the differential pressure generating valve serves as a flow resistance during the operation of the boost device, it is possible to secure high-level boost responsiveness and to improve responsiveness at the time of starting the control of the differential pressure generating valve. As a result, it is possible to further improve the merchantability.

The invention according to claim 6 is the control device of the internal-combustion engine according to claim 2, wherein the intake gas amount acquiring unit calculates a basic intake gas amount GGAScyl_b in response to the operation state of the internal-combustion engine 3 and calculates the intake gas amount GGAScyl by executing a filtering process (Equation (4)) giving a predetermined response delay characteristic for the basic intake gas amount GGAScyl_b (steps 80 and 81).

As in the invention according to claim 2, when a condition for starting and stopping the control of the EGR valve and the differential pressure generating valve is set depending on whether the intake gas amount reaches the target fresh air amount, there is concern that the opening degree of the differential pressure generating valve may continuously and repeatedly increase and decrease, that is, hunting may occur as described above. On the contrary, according to the control device of the internal-combustion engine, since the basic intake gas amount is calculated in response to the operation state of the internal-combustion engine and the intake gas amount is calculated by executing the filtering process giving a predetermined response delay characteristic for the basic intake gas amount, the intake gas amount is calculated in a state exhibiting a response delay characteristic for an actual value. Accordingly, even when the actual amount of air flowing inside the intake passage decreases in accordance with the start of the control of the differential pressure generating valve, some time is taken until this decreased state is reflected in the calculation result of the intake gas amount. Accordingly, even when the amount of the actual air flowing inside the intake passage decreases with the start of the control of the differential pressure generating valve after the intake gas amount reaches the target fresh air amount, it is possible to prevent a problem in which the calculation result of the intake gas amount becomes smaller than the target fresh air amount and to avoid the occurrence of hunting. As a result, it is possible to further improve the merchantability.

Hereinafter, a control device of an internal-combustion engine according to a first embodiment of the invention will be described with reference to the drawings. As shown in FIG. 1, a control device 1 of the embodiment is applied to an internal-combustion engine (hereinafter, referred to as an "engine") 3 mounted on a vehicle (not shown) as a power source and includes an ECU 2. As will be described later, an intake control process or the like is executed by the ECU 2.

Figure 2:
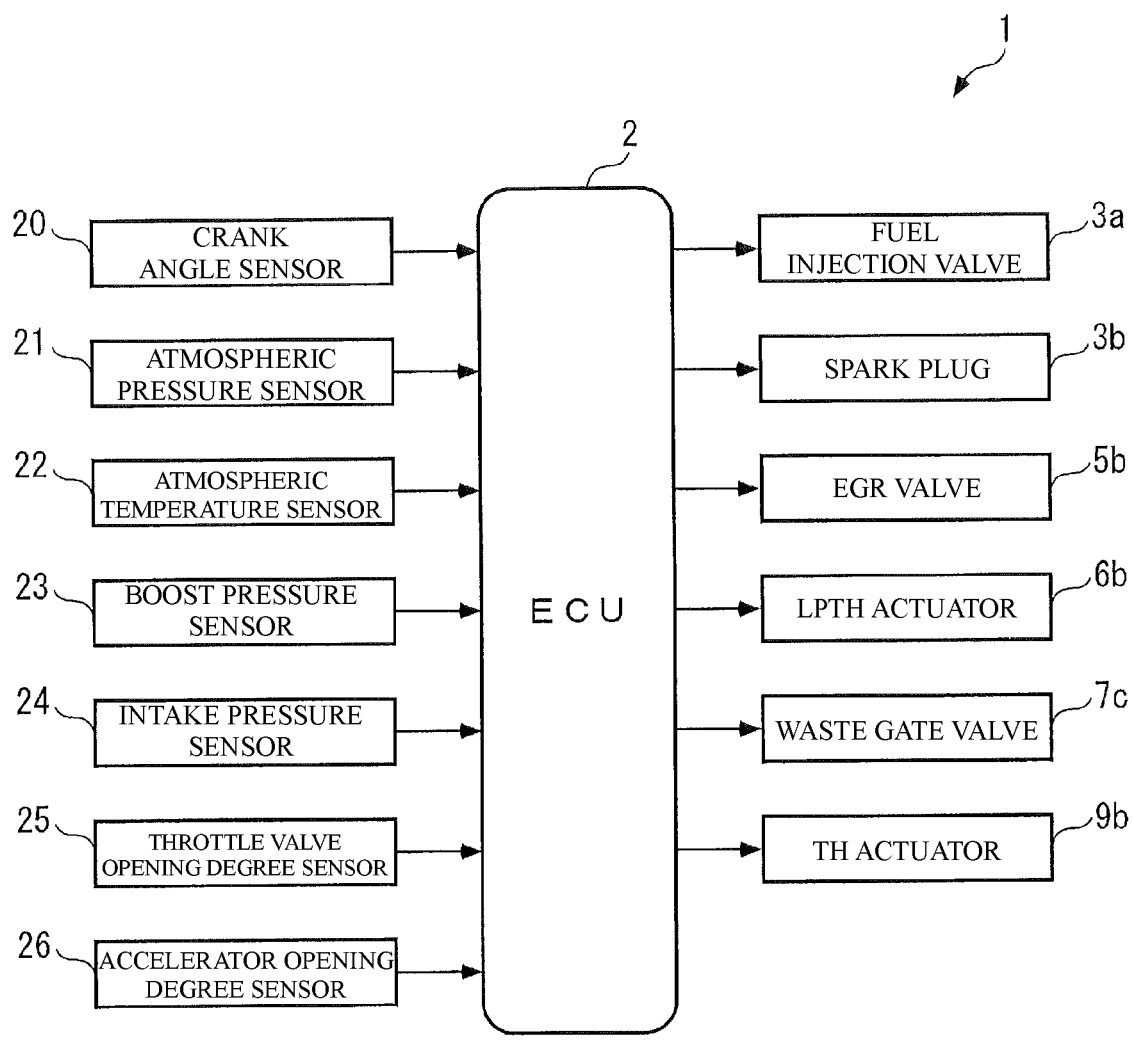
FIG. 2 is a block diagram showing an electrical configuration of the control device.

The engine 3 is of a four-cylinder gasoline engine type and the engine 3 is provided with a fuel injection valve 3a and an spark plug 3b for each cylinder (in FIG. 2, only one cylinder is shown). The fuel injection valve 3a is electrically connected to the ECU 2 and the ECU 2 controls an opening/closing timing of the fuel injection valve 3a to control a fuel injection amount and a fuel injection timing of the fuel injection valve 3a. Further, the spark plug 3b is also electrically connected to the ECU 2 and an ignition timing is controlled by the ECU 2.

Furthermore, an intake passage 4 of the engine 3 is provided with a differential pressure generating valve mechanism 6 of an EGR device 5, a compressor 7a of a boost device 7, an intercooler 8, and a throttle valve mechanism 9 in this order from the upstream side.

The EGR device 5 is used to recirculate a part of an exhaust gas inside an exhaust passage 11 toward the intake passage 4, and an amount of an exhaust gas recirculated toward the intake passage 4 in this way will be referred to as an "EGR amount" in the description below.

The EGR device 5 includes an EGR passage 5a, an EGR valve 5b, an EGR cooler 5c, and a differential pressure generating valve mechanism 6. One end of the EGR passage 5a is open to a downstream portion in relation to an exhaust purification catalyst 12 of the exhaust passage 11 and the other end thereof is open to a portion of the intake passage 4 located at an upstream side in relation to the compressor 7a and located at a downstream side in relation to the differential pressure generating valve mechanism 6.

The EGR valve 5b is a combination of a butterfly valve and an electric actuator (none is shown) and is electrically connected to the ECU 2. The ECU 2 controls an EGR amount by changing the opening degree of the EGR valve 5b.

Further, the EGR cooler 5c is a water cooling type cooler disposed on the side of the exhaust passage 11 in relation to the EGR valve 5b of the EGR passage 5a and cools a high-temperature recirculation gas flowing in the EGR passage 5a using engine cooling water.

Furthermore, the differential pressure generating valve mechanism 6 is used to generate a differential pressure (hereinafter, referred to as a "recirculation differential pressure") between the upstream side and the downstream side of the EGR valve 5b in order to smoothly introduce a recirculation gas toward the intake passage 4. The differential pressure generating valve mechanism 6 includes a differential pressure generating valve 6a and an LPTH actuator 6b opening and closing the differential pressure generating valve 6a. The differential pressure generating valve 6a is rotatably provided in the course of the intake passage 4 and generates a recirculation differential pressure by changing an opening degree from a maximal opening degree in a fully open state to a smaller opening degree.

The LPTH actuator 6b is a combination of a motor connected to the ECU 2 and a gear mechanism (nothing is shown), and the ECU 2 controls the opening degree of the differential pressure generating valve 6a through the LPTH actuator 6b, so that the recirculation differential pressure is controlled.

Meanwhile, the boost device 7 is a turbocharger type boost device and includes a compressor 7a which is provided in the course of the intake passage 4, a turbine 7b which is provided in the course of the exhaust passage 11 and rotates together with the compressor 7a, a waste gate valve 7c, and the like.

In the boost device 7, when the turbine 7b is rotationally driven by exhaust gas inside the exhaust passage 11, the compressor 7a also rotates with the turbine 7b so that an intake air inside the intake passage 4 is pressurized. That is, a boost operation is executed.

Further, the waste gate valve 7c is provided in the course of a turbine bypassing passage 7d bypassing the turbine 7b of the exhaust passage 11. The opening degree of the waste gate valve 7c is changed to changes a flow rate of the exhaust gas bypassing the turbine 7b and flowing in the turbine bypassing passage 7d. That is, a flow rate of the exhaust gas driving the turbine 7b is changed. Accordingly, a boost pressure is changed.

The waste gate valve 7c is an electric type waste gate valve electrically connected to the ECU 2, and the ECU 2 controls a boost pressure by controlling the opening degree of the waste gate valve 7c.

Further, the intercooler 8 is a water cooling type cooler and cools an intake gas of which a temperature has increased due to the boost operation of the boost device 7 when the intake gas passes through the intercooler.

Furthermore, the throttle valve mechanism 9 includes a throttle valve 9a and a TH actuator 9b opening and closing the throttle valve 9a. The throttle valve 9a is rotatably provided in the course of the intake passage 4 and changes a flow rate of an intake gas passing through the throttle valve 9a by a change in opening degree with a rotation.

The TH actuator 9b is a combination of a motor connected to the ECU 2 and a gear mechanism (nothing is shown), and the ECU 2 controls the opening degree of the throttle valve 9a through the TH actuator 9b, so that an amount (hereinafter, referred to as an "intake gas amount") of a gas sucked into the cylinder is controlled.

Further, the exhaust purification catalyst 12 is used to purify an exhaust gas flowing in the exhaust passage 11 and is provided at the downstream side of the turbine 7b of the exhaust passage 11.

Meanwhile, as shown in FIG. 2, a crank angle sensor 20, an atmospheric pressure sensor 21, an atmospheric temperature sensor 22, a boost pressure sensor 23, an intake pressure sensor 24, a throttle valve opening degree sensor 25, and an accelerator opening degree sensor 26 are electrically connected to the ECU 2.

The crank angle sensor 20 outputs a CRK signal corresponding to a pulse signal to the ECU 2 with a rotation of a crank shaft (not shown). Regarding the CRK signal, one pulse is output every predetermined crank angle (for example, 30°) and the ECU 2 calculates a rotation speed (hereinafter, referred to as an "engine rotation speed") NE of the engine 3 based on the CRK signal.

Further, the atmospheric pressure sensor 21 is provided inside an air cleaner (not shown), detects an atmospheric pressure PA which is a pressure of an atmosphere in the vicinity of the air cleaner, and outputs a detection signal representing the atmospheric pressure PA to the ECU 2.

Furthermore, the atmospheric temperature sensor 22 is also provided at the same position as the atmospheric pressure sensor 21, detects an atmospheric temperature TA which is a temperature of an atmosphere sucked into the air cleaner, and outputs a detection signal representing the atmospheric temperature TA to the ECU 2.

Meanwhile, the boost pressure sensor 23 is provided at the downstream side in relation to the intercooler 8 of the intake passage 4, detects a pressure (hereinafter, referred to as a "boost pressure") P3 inside the intake passage 4 and raised by a boost operation, and outputs a detection signal representing the pressure P3 to the ECU 2.

Furthermore, the intake pressure sensor 24 is provided at the downstream side in relation to the throttle valve 9a of the intake passage 4, detects a pressure (hereinafter, referred to as an "intake pressure") PB inside the intake passage 4 at the downstream side of the throttle valve 9a, and outputs a detection signal representing the pressure PB to the ECU 2.

Furthermore, the throttle valve opening degree sensor 25 detects an opening degree (hereinafter, referred to as a "throttle valve opening degree") TH of the throttle valve 9a and outputs a detection signal representing the opening degree TH to the ECU 2.

Further, the accelerator opening degree sensor 26 detects a stepping amount (hereinafter, referred to as an "accelerator opening degree") AP of an accelerator pedal (not shown) of the vehicle and outputs a detection signal representing the stepping amount AP to the ECU 2.

Meanwhile, the ECU 2 is configured as a microcomputer including a CPU, a RAM, a ROM, an I/O interface (nothing is shown), and the like and executes various control processes such as an intake control process and the like in response to the detection signals of various sensors 20 to 26 described above as will be described later. Additionally, in this embodiment, the ECU 2 corresponds to an intake gas amount acquiring unit, a target fresh air amount setting unit, a boost control unit, and an EGR control unit.

Figure 3:
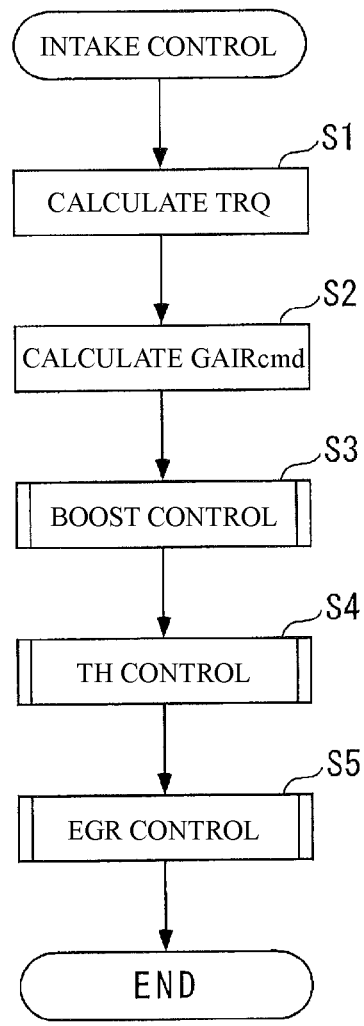
FIG. 3 is a flowchart showing an intake control process.

Next, an intake control process will be described with reference to FIG. 3. The intake control process is for controlling an intake gas amount by controlling the EGR device 5, the boost device 7, and the throttle valve mechanism 9 and is executed by the ECU 2 at predetermined control intervals (for example, every 10 msec).

As shown in the same drawing, first, in step 1 (abbreviated as "S1" in the drawing and the same below), a request torque TRQ is calculated by searching a map (not shown) in response to the engine rotation speed NE and the accelerator opening degree AP.

Next, a routine proceeds to step 2, a target fresh air amount GAIRcmd is calculated by searching a map (not shown) in response to the engine rotation speed NE and the request torque TRQ. The target fresh air amount GAIRcmd indicates a target value for an amount of new fresh sucked into the cylinder. In this embodiment, the target fresh air amount GAIRcmd corresponds to a basic target fresh air amount.

Figure 4:
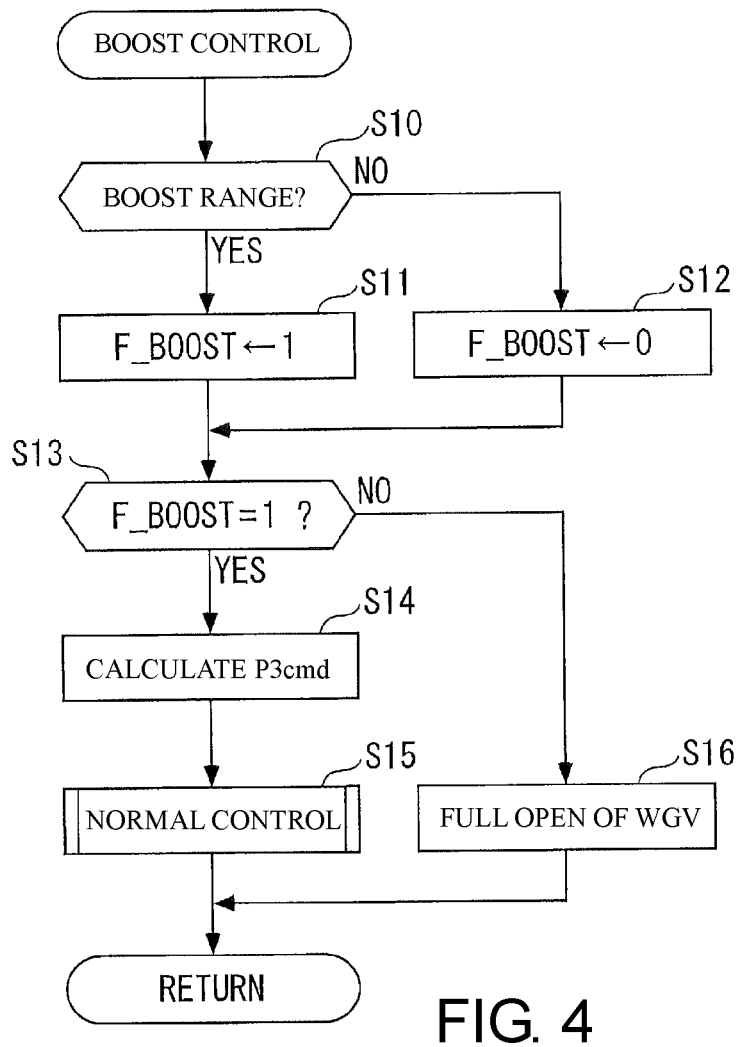
FIG. 4 is a flowchart showing a boost control process.

Next, the routine proceeds to step 3, a boost control process is executed. The boost control process is used to control the boost pressure P3 through the boost device 7 and is executed specifically as shown in FIG. 4.

As shown in the same drawing, first, in step 10, it is determined whether an operating range of the engine 3 is in a boost range (that is, any one of a boost range and a NA range). Specifically, it is determined whether a combination of the engine rotation speed NE and the request torque TRQ is in a predetermined boost range by searching a map (not shown).

When the determination result of step 10 is YES and the operating range of the engine 3 is in the boost range, the routine proceeds to step 11 and a boost flag F_BOOST is set to "1" to show the state.

Meanwhile, when the determination result of step 10 is NO and the operating range of the engine 3 is not in the boost range, that is, the operating range of the engine 3 is in the NA range where the engine 3 needs to be operated by natural intaking, the routine proceeds to step 12 and the boost flag F_BOOST is set to "0" to show the state.

In step 13 subsequent to step 11 or 12, it is determined whether the boost flag F_BOOST is "1". When the determination result is YES and the operating range of the engine 3 is in the boost range, it is determined that boost control needs to be executed. Then, the routine proceeds to step 14, a target boost pressure P3cmd is calculated by searching a map (not shown) in response to the engine rotation speed NE and the request torque TRQ.

Next, the routine proceeds to step 15 and a normal control process is executed. In the normal control process, the opening degree of the waste gate valve 7c is controlled so that the boost pressure P3 becomes the target boost pressure P3cmd. In this way, in step 15, the normal control process is executed and the present process is ended.

Meanwhile, when the determination result of step 13 is NO and the operating range of the engine 3 is in the NA range, it is determined that the boost control needs to be stopped. Then, the routine proceeds to step 16, the waste gate valve (in the drawing, "WGV") 7c is controlled such that it is fully opened, and the present process is ended.

Figure 5:
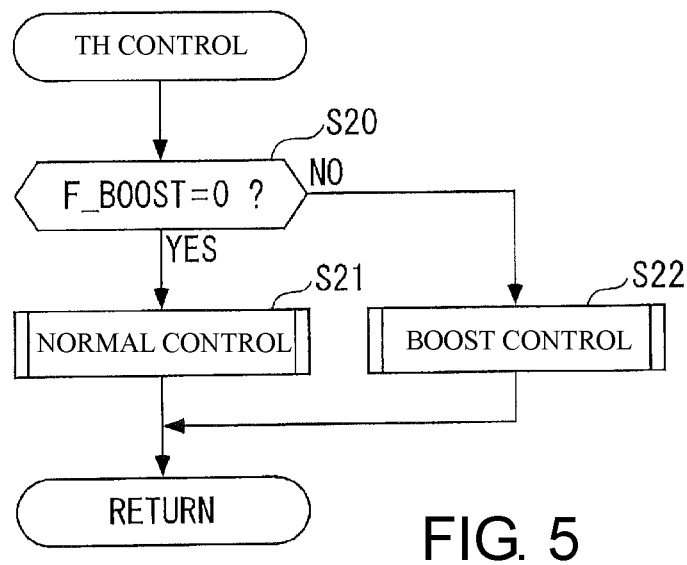
FIG. 5 is a flowchart showing a TH control process.

Returning to FIG. 3, in step 3, the boost control process is executed as described above. Then, the routine proceeds to step 4, a TH control process is executed. The TH control process is used to control the throttle valve opening degree TH and is executed, specifically, as shown in FIG. 5.

As shown in the same drawing, first, in step 20, it is determined whether the boost flag F_BOOST is "0". When the determination result is YES and the operating range of the engine 3 is in the NA range, the routine proceeds to step 21 and the normal control process is executed.

In the normal control process, first, a target throttle valve opening degree THcmd is calculated in response to the target fresh air amount GAIRcmd described above and the target EGR amount GEGRcmd to be described below by a predetermined control process (map searching or the like).

Then, the TH actuator 9b is driven by supplying a control input signal corresponding to the target throttle valve opening degree THcmd. Accordingly, the throttle valve opening degree TH is controlled such that it becomes the target throttle valve opening degree THcmd. As described above, in step 21, the normal control process is executed and the present process is ended.

Meanwhile, when the determination result of step 20 is NO and the operating range of the engine 3 is in the boost range, the routine proceeds to step 22, the boost control process is executed.

In the boost control process, first, the target throttle valve opening degree THcmd is calculated by a predetermined control method (map searching or the like) in response to the target fresh air amount GAIRcmd, the target boost pressure P3cmd, and the target EGR amount GEGRcmd described above. The target throttle valve opening degree THcmd in this case is calculated as a value close to the maximal opening degree (that is, a fully opened state) of the throttle valve 9a.

Then, the TH actuator 9b is driven by supplying a control input signal corresponding to the target throttle valve opening degree THcmd. Accordingly, the throttle valve opening degree TH is controlled such that it becomes the target throttle valve opening degree THcmd. As described above, in step 22, the boost control process is executed and the present process is ended.

Figure 6:
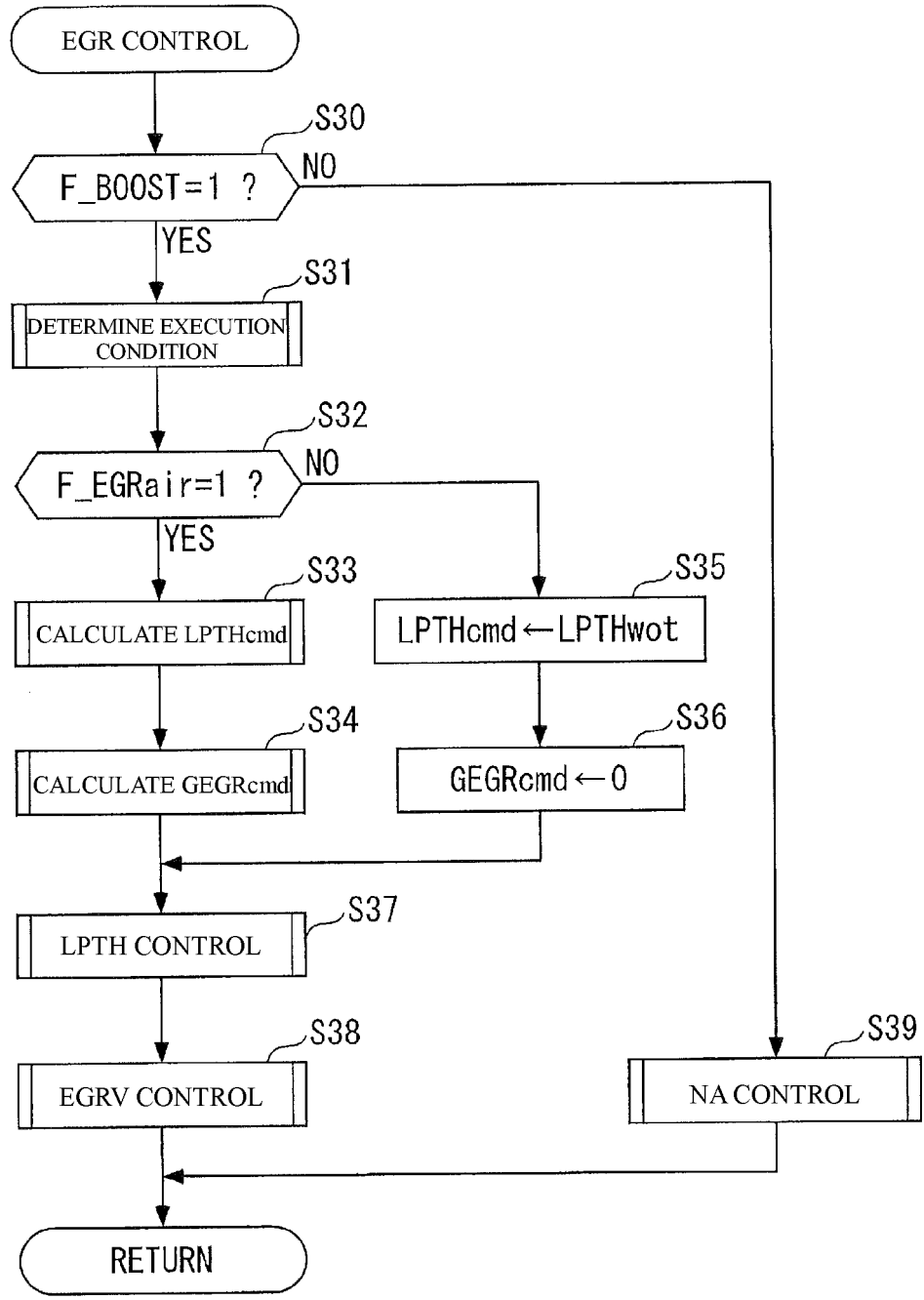
FIG. 6 is a flowchart showing an EGR control process.

Returning to FIG. 3, in step 4, the TH control process is executed as described above. Then, the routine proceeds to step 5, the EGR control process is executed. The EGR control process is used to control the EGR amount through the EGR device 5 and is executed, specifically, as shown in FIG. 6.

Figure 7:
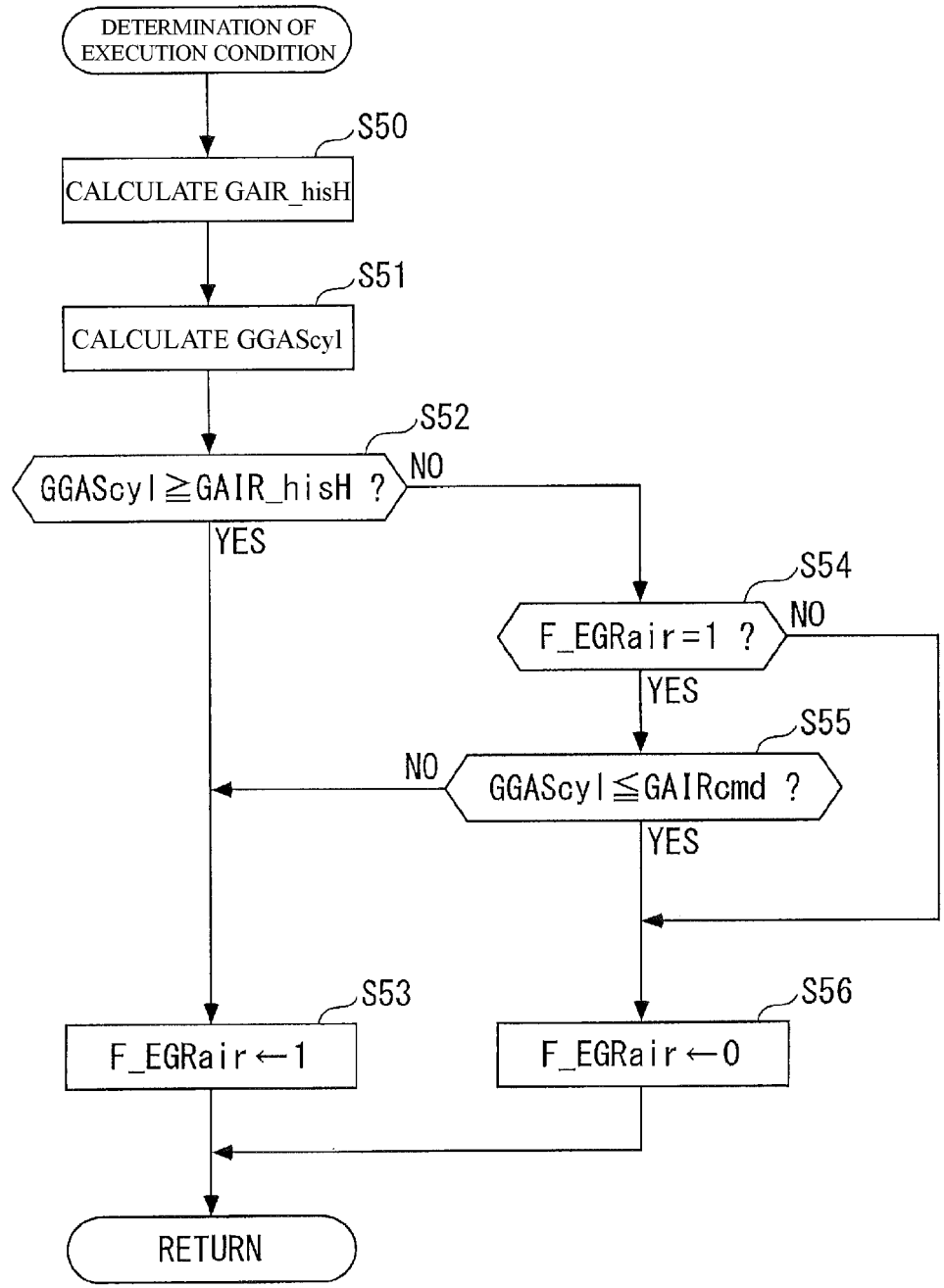
FIG. 7 is a flowchart showing an execution condition determination process.

As shown in the same drawing, first, in step 30, it is determined whether the boost flag F_BOOST is "1". When the determination result is YES and the operating range of the engine 3 is in the boost range, the routine proceeds to step 31, the execution condition determination process is executed. The execution condition determination process is to determine whether an EGR control execution condition is established during the execution of the boost control and is executed, specifically, as shown in FIG. 7.

As shown in the same drawing, first, in step 50, an upper-limit target fresh air amount GAIR_hisH is calculated by the following equation (1).

$$GAIR\_hisH = GAIRcmd + DGAIR \quad (1)$$

DGAIR in this equation (1) is a predetermined value. As shown in the equation (1), an upper-limit target fresh air amount GAIR_hisH is calculated by adding a predetermined value DGAIR to the target fresh air amount GAIRcmd. As will be described later, this value is set to prevent a problem in which an intake gas amount GGAScyl is smaller than the target fresh air amount GAIRcmd after the EGR control is started during the execution of the boost control. Thus, the predetermined value DGAIR is set to a value (a positive constant value) capable of realizing such a control.

Next, the routine proceeds to step 51, the intake gas amount GGAScyl is calculated by searching a map (not shown) in response to the boost pressure P3. The intake gas amount GGAScyl corresponds to an estimated value of a gas amount sucked into the cylinder.

Next, in step 52, it is determined whether the intake gas amount GGAScyl is equal to or larger than the upper-limit target fresh air amount GAIR_hisH. When the determination result is YES, it is determined that the EGR control execution condition is established. Then, the routine proceeds to step 53, an EGR execution condition flag F_EGRair is set to "1" to show the state, and the present process is ended.

Meanwhile, when the determination result of step 52 is NO, the routine proceeds to step 54, it is determined whether an EGR execution condition flag F_EGRair is "1". When the determination result is YES, that is, the EGR control execution condition is established at the precedent control timing, the routine proceeds to step 55, it is determined whether the intake gas amount GGAScyl is equal to or smaller than the target fresh air amount GAIRcmd.

When the determination result is NO and a relation of GGAScyl>GAIRcmd is established, it is determined that the EGR control execution condition is established. Then, the routine proceeds to step 53 to show the state and the present process is ended.

Meanwhile, when the determination result of step 55 is YES, it is determined that the EGR control execution condition is not established. Then, the routine proceeds to step 56, an EGR execution condition flag F_EGRair is set to "0" to show the state, and the present process is ended.

Meanwhile, when the determination result of step 54 is NO and the EGR control execution condition is not established at the precedent control timing, the process in step 56 is executed and the present process is ended.

Returning to FIG. 6, in step 31, the execution condition determination process is executed as described above. Then, the routine proceeds to step 32, it is determined whether the EGR execution condition flag F_EGRair is "1".

Figure 8:
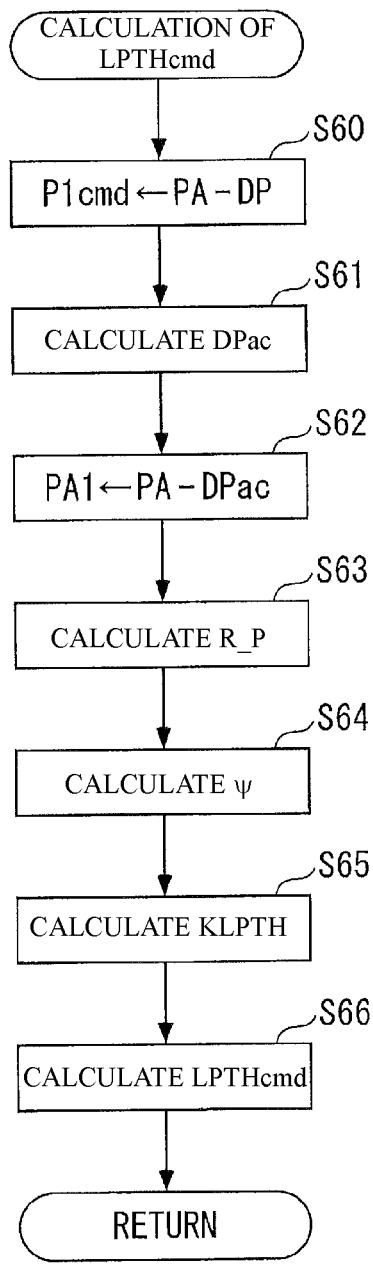
FIG. 8 is a flowchart showing a target differential pressure valve opening degree calculation process.

When the determination result is YES and the EGR control needs to be executed, the routine proceeds to step 33, a target differential pressure valve opening degree LPTHcmd is calculated. The target differential pressure valve opening degree LPTHcmd is a target value of the opening degree of the differential pressure generating valve 6a and is calculated, specifically, as shown in FIG. 8.

As shown in the same drawing, first, in step 60, the target inlet pressure P1cmd is set to a difference (PA−DP) between the atmospheric pressure PA and a predetermined differential pressure DP. The target inlet pressure P1cmd corresponds to a target value of a pressure at a junction portion (that is, an EGR inlet) between the intake passage 4 and the EGR passage 5a. Further, the predetermined differential pressure DP is a value of a differential pressure to be generated by the differential pressure generating valve 6a and is set to a positive constant value.

Next, the routine proceeds to step 61, an air cleaner pressure loss DPac is calculated by searching a map (not shown) in response to the target fresh air amount GAIRcmd. The air cleaner pressure loss DPac corresponds to a pressure loss in the intake passage 4 from the air cleaner to the differential pressure generating valve 6a.

Next, in step 62, an upstream pressure PA1 is set to a difference (PA−DPac) between the atmospheric pressure PA and the air cleaner pressure loss DPac. The upstream pressure PA1 corresponds to an upstream pressure in the vicinity of the differential pressure generating valve 6a of the intake passage 4.

In step 63 subsequent to step 62, a pressure ratio R_P is calculated by the following equation (2).

$$R\_P = \frac{PA1}{P1cmd} \quad (2)$$

Figure 9:
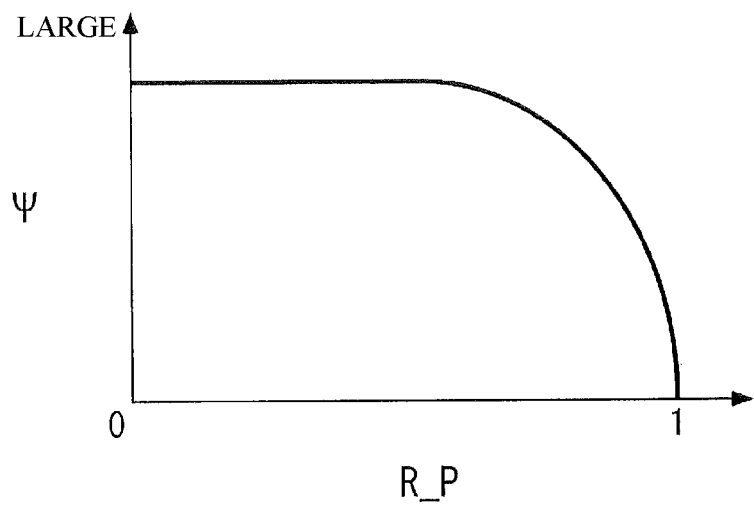
FIG. 9 is a diagram showing an example of a map used to calculate a flow function.

Next, the routine proceeds to step 64, a flow function ψ is calculated by searching a map shown in FIG. 9 in response to the pressure ratio R_P.

Next, in step 65, an effective opening area KLPTH is calculated by the following equation (3). The effective opening area KLPTH corresponds to an effective opening area of the differential pressure generating valve 6a, and the equation (3) is derived from an equation of a nozzle when the differential pressure generating valve 6a is regarded as a nozzle. Further, R in the equation (3) is a gas constant.

$$KLPTH = \frac{GAIRcmd \cdot \sqrt{R \cdot TA}}{PA1 \cdot \Psi} \quad (3)$$

Figure 10:
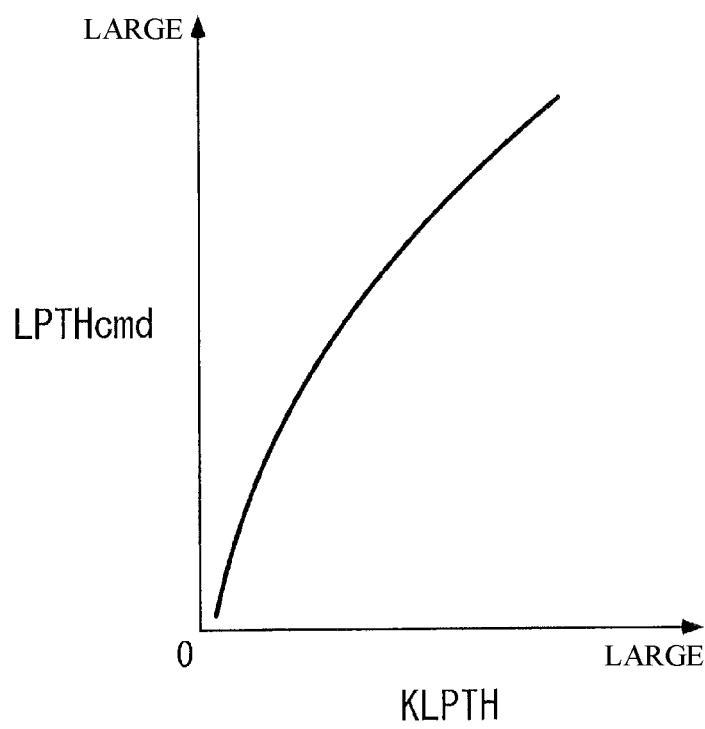
FIG. 10 is a diagram showing an example of a map used to calculate a target differential pressure valve opening degree.

In step 66 subsequent to step 65, the target differential pressure valve opening degree LPTHcmd is calculated by searching a map shown in FIG. 10 in response to the effective opening area KLPTH and the present process is ended.

Returning to FIG. 6, in step 33, the target differential pressure valve opening degree LPTHcmd is calculated as described above. Then, the routine proceeds to step 34, the target EGR amount GEGRcmd is calculated. The target EGR amount GEGRcmd is a value corresponding to a target value of the EGR amount to be recirculated by the EGR device 5. Although the calculation method is not shown, the target EGR amount GEGRcmd is calculated according to the same method as the target differential pressure valve opening degree LPTHcmd of step 33, that is, a method adopting the equation of the nozzle when regarding the EGR valve 5b as the nozzle.

Meanwhile, when the determination result of step 32 is NO and the EGR control needs to be stopped, the routine proceeds to step 35, the target differential pressure valve opening degree LPTHcmd is set to a maximal opening degree LPTHwot. The maximal opening degree LPTHwot is set to an opening degree in which the differential pressure generating valve 6a is fully opened, that is, an opening degree in which no differential pressure is generated between the upstream side and the downstream side of the EGR valve 5b.

Next, the routine proceeds to step 36, the target EGR amount GEGRcmd is set to a value 0.

In step 37 subsequent to step 34 or 36, an LPTH control process is executed. In the LPTH control process, the differential pressure generating valve opening degree LPTH is controlled such that it becomes the target differential pressure valve opening degree LPTHcmd through the LPTH actuator 6b.

Next, the routine proceeds to step 38, the EGRV control process is executed. In the EGRV control process, the target opening degree of the EGR valve 5b is calculated by searching a map (not shown) in response to the target EGR amount GEGRcmd and the opening degree of the EGR valve 5b is controlled such that it becomes the target opening degree. As described above, the EGRV control process is executed in step 38 and the present process is ended.

Meanwhile, when the determination result of step 30 is NO and the operating range of the engine 3 is in the NA range, the routine proceeds to step 39, an NA control process is executed. In the NA control process, the differential pressure generating valve opening degree LPTH is controlled by the same method as steps 33 and 37 and the opening degree of the EGR valve 5b is controlled by the same method as steps 34 and 38. As described above, the NA control process is executed in step 39 and the present process is ended.

Returning to FIG. 3, in step 5, the EGR control process is executed as described above and the intake control process is ended.

Figure 11A:
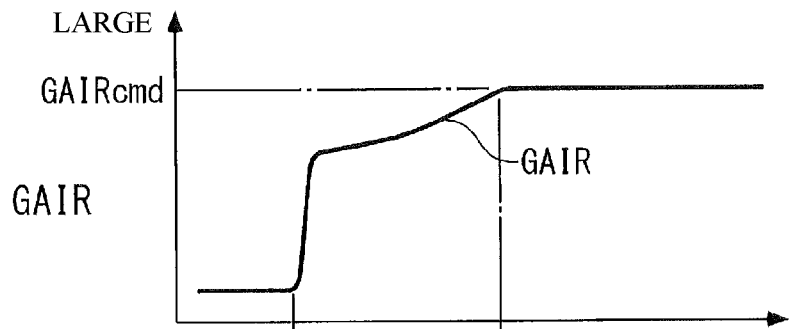
FIGS. 11(a) to 11(c) are diagrams illustrating a control principle of the first embodiment, where
Figure 11B:
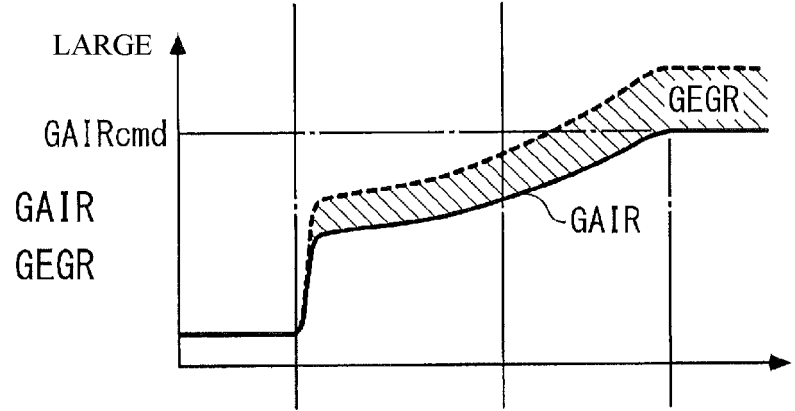
Figure 11C:
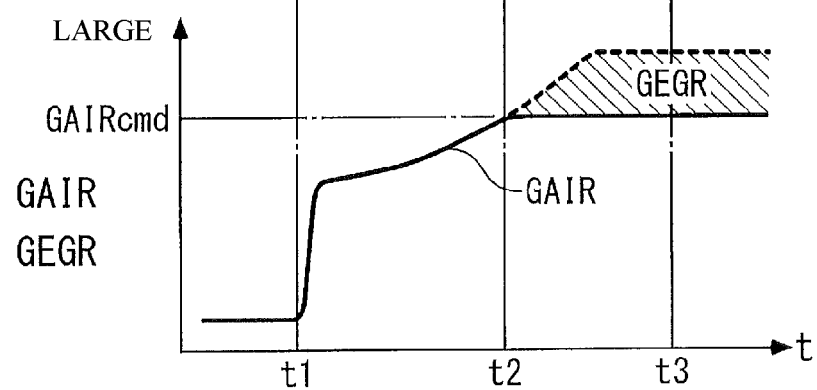

Next, the reason why the intake control process of the embodiment is executed by the above-described method and the principle thereof will be described with reference to FIGS. 11(*a*) to 11(*c*). FIGS. 11(*a*) to 11(*c*) show a transition of the in-cylinder fresh air amount GAIR when the operating range of the engine 3 is changed from the NA range to the boost range and the boost control is started. Specifically, FIG. 11(*a*) shows a case where the boost control is started while the EGR control is stopped.

Further, FIG. 11(*b*) shows a transition of the in-cylinder fresh air amount GAIR and the EGR amount (hereinafter, referred to as an "in-cylinder EGR amount") GEGR inside the cylinder at the time of starting the EGR control and the boost control at the same time. Particularly, a range depicted by hatching in the drawing indicates an in-cylinder EGR amount GEGR. This point is also the same in FIG. 11(*c*). Further, FIG. 11(*c*) shows a case at the time of starting the EGR control at the timing in which the in-cylinder fresh air amount GAIR reaches the target fresh air amount GAIRcmd after the boost control is started.

As shown in FIG. 11(*a*), when only the boost control is started at the time t1 while the EGR control is stopped, the in-cylinder fresh air amount GAIR reaches the target fresh air amount GAIRcmd at the time t2 with a predetermined response delay.

On the contrary, as shown in FIG. 11(*b*), when the EGR control and the boost control are started at the same time at the time t1, the recirculation gas and the fresh air flow into the cylinder at the same time. Thus, the amount of the fresh air flowing into the cylinder decreases by the amount to be pushed by the recirculation gas. As a result, in the case of a gasoline engine like the engine 3 of the embodiment, a fuel injection amount decreases with a decrease in fresh air amount, for example, during a stoichiometric operation and thus exhaust energy decreases. Accordingly, since an increase in boost pressure P3 is delayed due to a decrease in work of the turbine 7*b*, an increase in in-cylinder fresh air amount GAIR is delayed. Due to the above-described reason, the in-cylinder fresh air amount GAIR reaches the target fresh air amount GAIRcmd at the timing (t3) later than the stop state of the EGR control.

In order to avoid a delay while the in-cylinder fresh air amount GAIR reaches the target fresh air amount GAIRcmd, that is, a boost response delay, as shown in FIG. 11(*c*), the boost control may be started while the EGR control is stopped at the time t1, and the EGR control may be started at the timing (the time t2) in which the in-cylinder fresh air amount GAIR reaches the target fresh air amount GAIRcmd. In other words, a method of starting the boost control while the EGR control is stopped and starting the EGR control at the timing in which the in-cylinder fresh air amount GAIR reaches the target fresh air amount GAIRcmd is considered.

Figure 12:
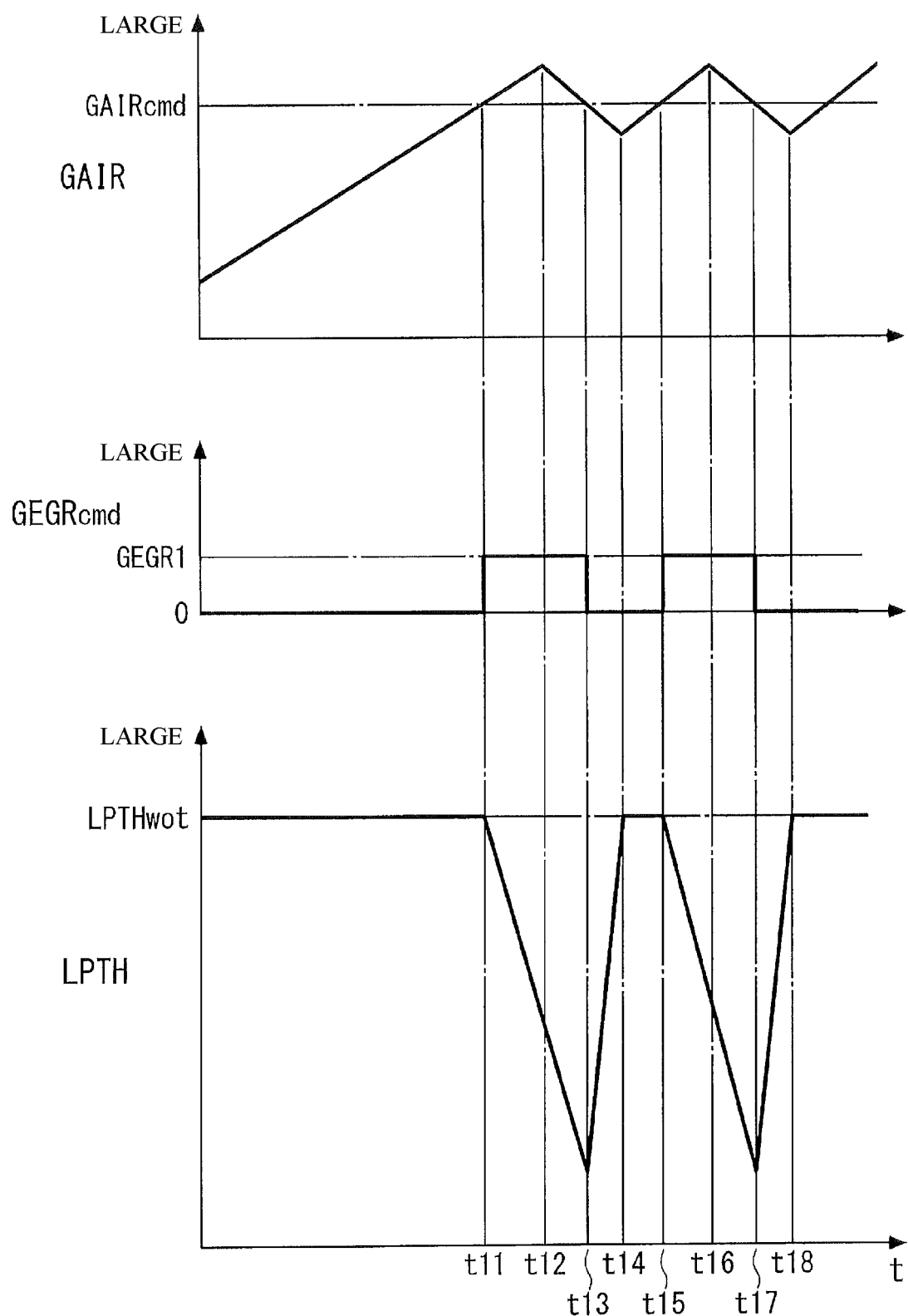
FIG. 12 is a timing chart showing a state where hunting occurs when EGR control is started at a timing at which an in-cylinder fresh air amount reaches a target fresh air amount after boost control starts.

However, when the control method shown in FIG. 11(*c*) is used, there is a concern that the chattering to be described later occurs and the intake control becomes unstable. That is, as shown in FIG. 12, when the boost control is executed while the EGR control is stopped and the differential pressure generating valve opening degree LPTH is controlled such that it becomes the maximal opening degree LPTHwot, the in-cylinder fresh air amount GAIR increases and reaches the target fresh air amount GAIRcmd at the time t11. At that timing, since the target EGR amount GEGRcmd is set to a value GEGR1 corresponding to the operation state of the engine 3, the EGR control is started.

Accordingly, the differential pressure generating valve opening degree LPTH is controlled to decrease from the maximal opening degree LPTHwot after the time t11. Thereafter, the in-cylinder fresh air amount GAIR decreases after the time t12. Then, when the in-cylinder fresh air amount GAIR becomes smaller than the target fresh air amount GAIRcmd at the time t13, the EGR control is stopped and the differential pressure generating valve opening degree LPTH is controlled to increase toward the maximal opening degree LPTHwot. With an increase in differential pressure generating valve opening degree LPTH, the in-cylinder fresh air amount GAIR increases after the time t14 and reaches the target fresh air amount GAIRcmd at the time t15, and then the same operations between the time t11 to the time t14 are repeated between the time t15 to the time t18. As described above, when the control method shown in FIG. 11(*c*) is used, chattering occurs and thus the intake control becomes unstable.

Figure 13:
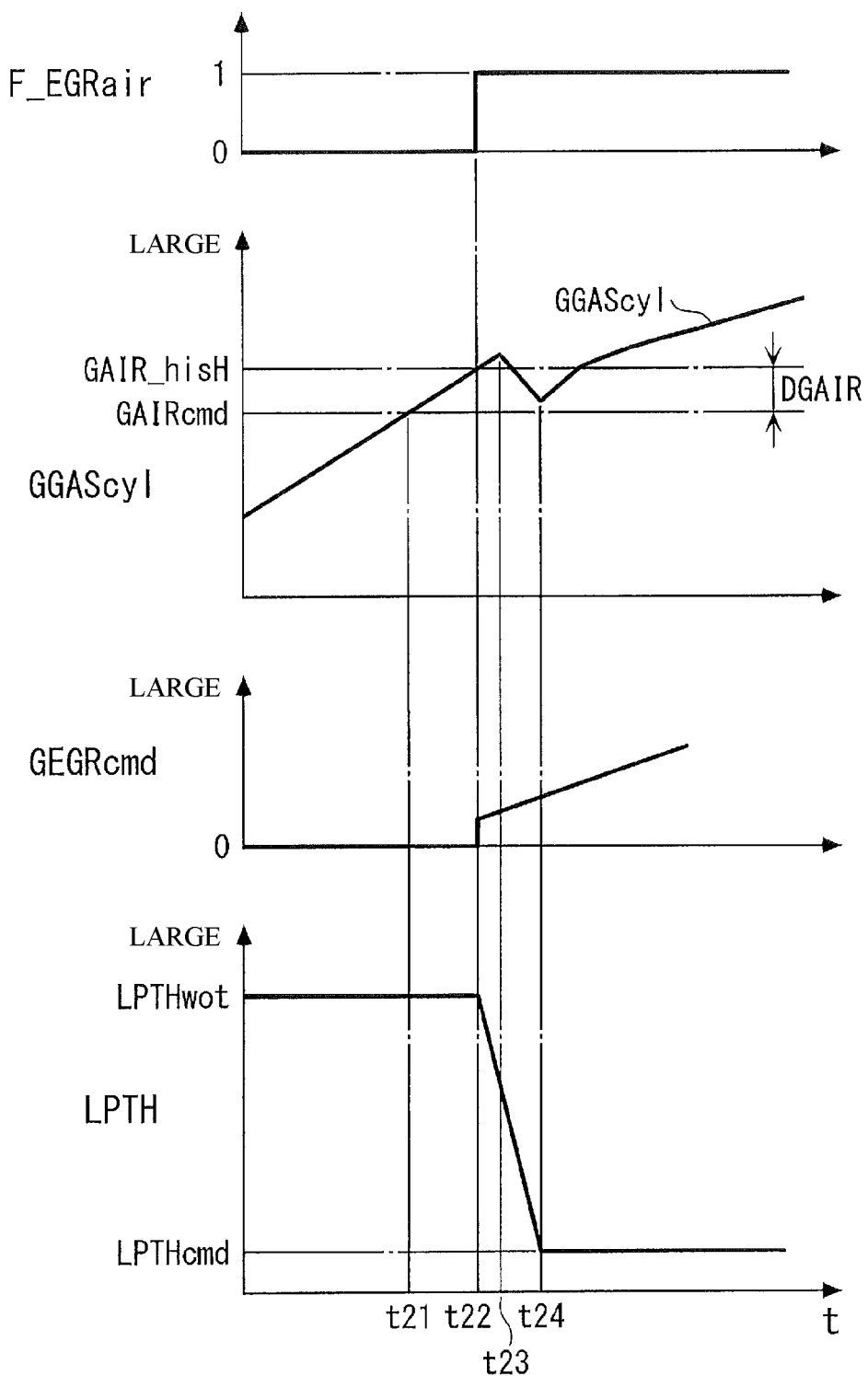
FIG. 13 is a timing chart showing an example of a control result at the time of executing an intake control process of the first embodiment.

In order to avoid the occurrence of the chattering and to secure the stability of the intake control, in the case of the embodiment, the intake control process is executed according to the control method shown in FIGS. 3 to 8 in the case of the embodiment. Hereinafter, a control result when executing the intake control process of the embodiment will be described with reference to FIG. 13.

As shown in the same drawing, when the boost control is executed while the EGR control is stopped and the differential pressure generating valve opening degree LPTH is controlled to become the maximal opening degree LPTHwot, the intake gas amount GGAScyl increases. In this case, since the EGR control is stopped, the intake gas amount GGAScyl is the same as the in-cylinder flesh air amount GAIR. Then, although the intake gas amount GGAScyl reaches the target fresh air amount GAIRcmd at the time t21, the EGR control is kept in a stop state since a relation of GGAScyl<GAIR_hisH is established at that timing.

Next, when a relation of GGAScyl≥GAIR_hisH is established at the time t22 in accordance with the progress of the control, the EGR execution condition flag F_EGRair is set to "1" and the EGR control process is started. That is, since the target EGR amount GEGRcmd is set to a value corresponding to the operation state from the value 0, the EGR valve 5*b* is controlled to be opened. At the same time, the target differential pressure valve opening degree LPTHcmd is set to generate a differential pressure between the upstream side and the downstream side of the EGR valve 5*b*, and the differential pressure generating valve opening degree LPTH is controlled to change from the maximal opening degree LPTHwot toward the target differential pressure valve opening degree LPTHcmd.

Although the intake gas amount GGAScyl decreases after the time t23 in accordance with a decrease in differential pressure generating valve opening degree LPTH at the time of executing the EGR control, the intake gas amount GGAScyl is controlled not to become smaller than the target fresh air amount GAIRcmd. This is because the predetermined value DGAIR is set as described above.

Then, the intake gas amount GGAScyl increases after the differential pressure generating valve opening degree LPTH reaches the target differential pressure valve opening degree LPTHcmd at the time t24. That is, it can be seen that the boost control and the EGR control can be executed while keeping a relation of GGAScyl>GAIRcmd.

As described above, according to the control device 1 of the first embodiment, the boost device 7 is controlled so that the boost pressure P3 becomes the target boost pressure P3cmd when the operating range of the engine 3 is in the boost range. Since the EGR control is stopped when the intake gas amount GGAScyl does not reach the upper-limit target fresh air amount GAIR_hisH during the control of the boost device 7, the intake gas amount GGAScyl becomes the same as the in-cylinder fresh air amount GAIR.

Then, the EGR control is started when the intake gas amount GGAScyl (=GAIR) reaches the upper-limit target fresh air amount GAIR_hisH. That is, the EGR valve 5b is opened to start the exhaust gas recirculation and the differential pressure generating valve 6a is controlled to generate a differential pressure between the upstream side and the downstream side of the EGR valve 5b. In this case, the upper-limit target fresh air amount GAIR_hisH is calculated by adding a predetermined value DGAIR to the target fresh air amount GAIRcmd, and the predetermined value DGAIR is set to a value capable of controlling the intake gas amount GGAScyl not to be smaller than the target fresh air amount GAIRcmd after the EGR control is started during the execution of the boost control. Therefore, it is possible to promptly secure the required in-cylinder fresh air amount GAIR while avoiding the occurrence of hunting in the differential pressure generating valve 6a after the EGR control is started. That is, since it is possible to promptly and appropriately secure the in-cylinder fresh air amount GAIR even when the engine 3 is in a transient operation state, it is possible to improve the boost responsiveness, that is, the responsiveness of the generated torque. As a result, it is possible to improve the merchantability.

Further, as described above, since the EGR valve 5b is controlled to be opened and the differential pressure generating valve 6a is controlled to generate a differential pressure between the upstream side and the downstream side of the EGR valve 5b, it is possible to reliably start the introduction of the recirculation gas when the intake gas amount GGAScyl reaches the upper-limit target fresh air amount GAIR_hisH. As a result, it is possible to obtain a fuel saving effect by the introduction of the recirculation gas while securing high-level boost responsiveness even when the engine 3 is in a transient operation state.

Furthermore, when the intake gas amount GGAScyl does not reach the upper-limit target fresh air amount GAIR_hisH, the target differential pressure valve opening degree LPTHcmd is set to the maximal opening degree LPTHwot and the differential pressure generating valve opening degree LPTH is controlled to become the maximal opening degree LPTHwot. Since the maximal opening degree LPTHwot is set to an opening degree in which no differential pressure is generated between the upstream side and the downstream side of the EGR valve 5b and the differential pressure generating valve 6a is fully opened, it is possible to prevent a problem in which the differential pressure generating valve 6a serves as a flow resistance during the operation of the boost device 7 and to secure high-level boost responsiveness.

Additionally, the first embodiment is an example in which the target throttle valve opening degree THcmd is set to a value close to the predetermined maximal opening degree THwot in the case of the boost flag F_BOOST=1 during the TH control process, but the target throttle valve opening degree THcmd may be set to the maximal opening degree THwot in the case of the boost flag F_BOOST=1.

Further, the first embodiment is an example in which the predetermined differential pressure DP is set to a constant value, but the predetermined differential pressure DP may be set in response to the operation state (for example, the engine rotation speed NE and the request torque TRQ) of the engine 3.

Furthermore, the first embodiment is an example in which the predetermined value DGAIR is set to a constant value, but the predetermined value DGAIR may be set in response to the operation state (for example, the engine rotation speed NE and the request torque TRQ) of the engine 3.

Meanwhile, when the determination result is NO in step 32, that is, the intake gas amount GGAScyl does not reach the upper-limit target fresh air amount GAIR_hisH, the first embodiment is an example in which the target differential pressure valve opening degree LPTHcmd is set to the maximal opening degree LPTHwot in step 35, but instead of this configuration, the target differential pressure valve opening degree LPTHcmd may be set to a predetermined standby opening degree in step 35. In this case, the standby opening degree may be set to a value larger than the effective opening degree of the differential pressure generating valve 6a and smaller than the maximal opening degree LPTHwot. With such a configuration, since it is possible to prevent a problem in which the differential pressure generating valve 6a serves as a flow resistance during the operation of the boost device 7, it is possible to secure high-level boost responsiveness and to improve the responsiveness at the time of starting the control of the differential pressure generating valve 6a. As a result, it is possible to further improve the merchantability.

Further, the first embodiment is an example in which the intake gas amount GGAScyl is calculated in response to the boost pressure P3 corresponding to the operation state of the engine 3, but the intake gas amount GGAScyl may be calculated in response to other parameters (for example, the engine rotation speed NE or the request torque TRQ) representing the operation state of the engine 3.

Furthermore, the first embodiment is an example in which the start of the EGR control during the execution of the boost control is determined based on a comparison result between the intake gas amount GGAScyl and the upper-limit target fresh air amount GAIR_hisH, but the start of the EGR control may be determined during the execution of the boost control based on a comparison result between the intake gas amount GGAScyl and the target fresh air amount GAIRcmd under a condition in which there is no concern of the occurrence of the chattering.

Meanwhile, the first embodiment is an example in which the turbocharger type boost device 7 is used as the boost device, but the boost device of the invention is not limited thereto as long as the boost operation may be executed. For example, an electric turbocharger or a supercharger may be used as the boost device.

Further, the first embodiment is an example in which the control device 1 of the invention is applied to the internal-combustion engine 3 for the vehicle, but the control device of the invention is not limited thereto and can be also applied to the internal-combustion engine including the boost device and the EGR device. For example, the control device of the invention may be applied to an internal-combustion engine for a ship or an internal-combustion engine for other industrial machines.

Furthermore, the first embodiment is an example in which the control device 1 of the invention is applied to the gasoline engine type internal-combustion engine 3, but the control device of the invention is not limited thereto and can be also applied to an internal-combustion engine such as a diesel engine.

Figure 14:
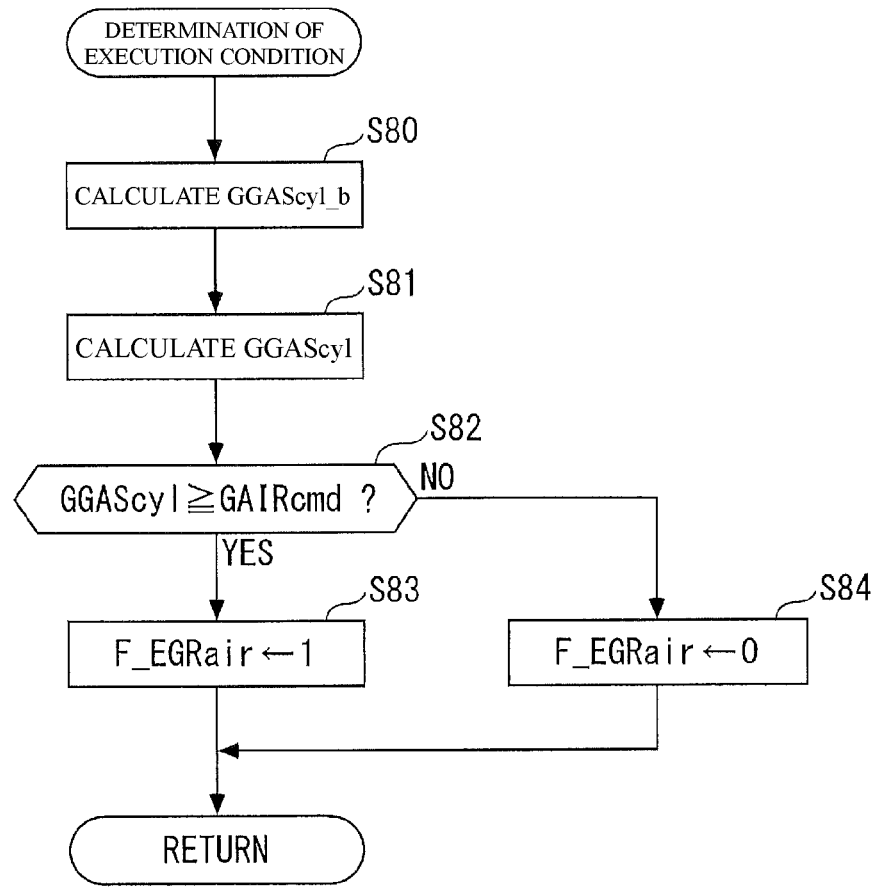
FIG. 14 is a flowchart showing an execution condition determination process of a second embodiment.

Next, a control device of an internal-combustion engine according to a second embodiment will be described. Since the control device of the embodiment has the same mechanical and electrical configurations as those of the control device 1 of the first embodiment except that the execution condition determination process of FIG. 14 is executed instead of the execution condition determination process of FIG. 7, a description will be made below by focusing on the contents of FIG. 14. Further, the same reference numerals will be used for the same component as that of the first embodiment.

Additionally, in this embodiment, the ECU 2 corresponds to an intake gas amount acquiring unit, a target fresh air amount setting unit, a boost control unit, and an EGR control unit.

As shown in FIG. 14, first, in step 80, a basic intake gas amount GGAScyl_b is calculated by searching a map (not shown) in response to the boost pressure P3. In this case, a map obtained by substituting the intake gas amount GGAScyl with the basic intake gas amount GGAScyl_b in the map used to calculate the intake gas amount GGAScyl in step 51 is used.

Next, the routine proceeds to step 81, the intake gas amount GGAScyl is calculated by the first-order lag filtering arithmetic expression shown in the following equation (4).

$$GGAScyl = K \cdot GGAScyl\_z + (1-K) \cdot GGAScyl\_b \quad (4)$$

K of the above-described equation (4) indicates a filter coefficient set to establish a relation of 0<K<1, and GGAScyl_z indicates a precedent value (a value calculated at the precedent control timing) of the intake gas amount GGAScyl.

Next, in step 82, it is determined whether the intake gas amount GGAScyl is equal to or larger than the target fresh air amount GAIRcmd. When the determination result is YES, it is determined that the EGR control execution condition is established. Then, the routine proceeds to step 83, the EGR execution condition flag F_EGRair is set to "1" to show the state, and the present process is ended.

Meanwhile, when the determination result of step 82 is NO, it is determined that the EGR control execution condition is not established. Then, the routine proceeds to step 84, the EGR execution condition flag F_EGRair is set to "0" to show the state, and the present process is ended.

Figure 15:
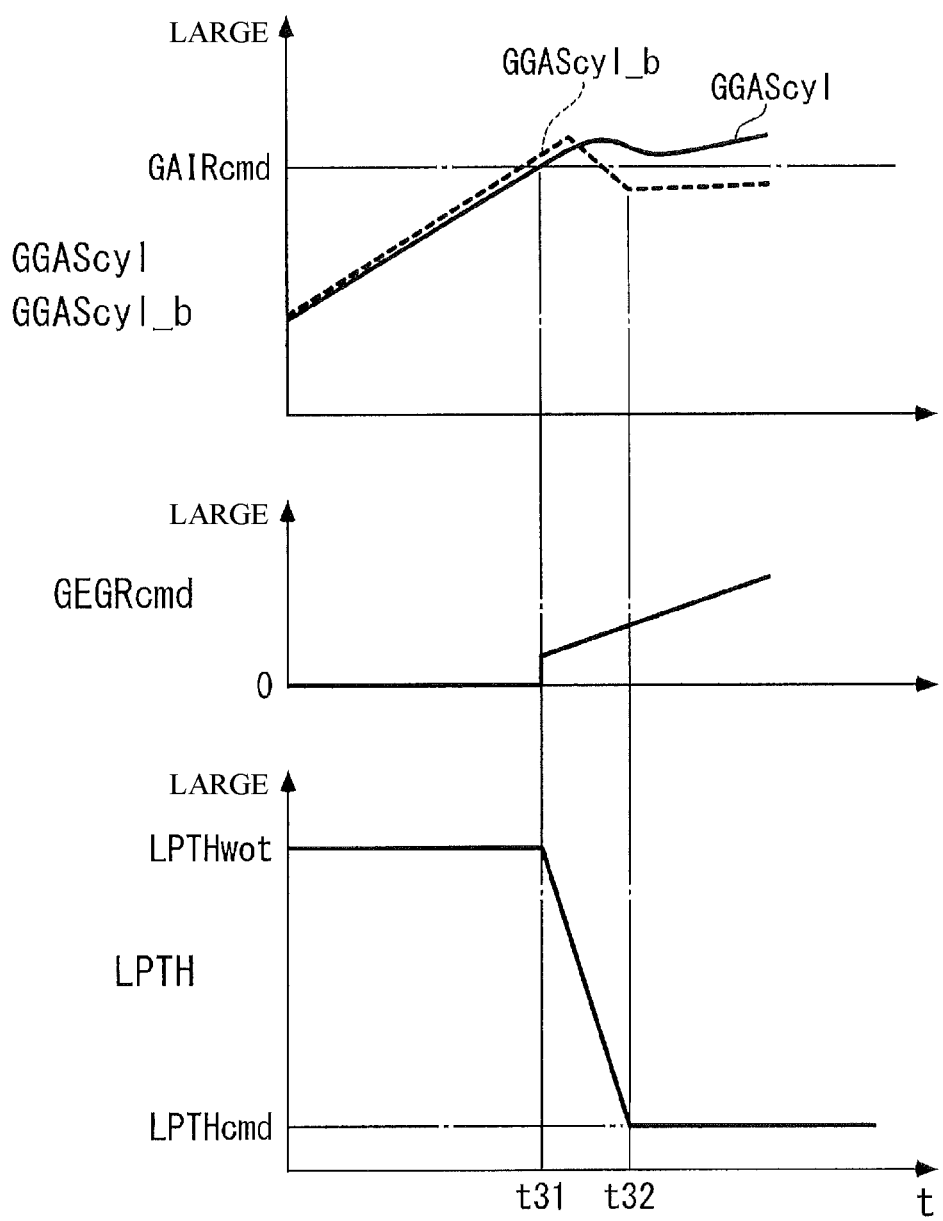
FIG. 15 is a timing chart showing an example of a control result at the time of executing an intake control process of the second embodiment.

Next, a control result at the time of executing the intake control process by the control device of the second embodiment will be described with reference to FIG. 15. As shown in the same drawing, when the boost control is executed while the EGR control is stopped and the differential pressure generating valve opening degree LPTH is controlled to become the maximal opening degree LPTHwot, the basic intake gas amount GGAScyl_b and the intake gas amount GGAScyl increase.

In this case, since the EGR control is stopped, the basic intake gas amount GGAScyl_b is the same as the in-cylinder fresh air amount GAIR. However, the intake gas amount GGAScyl changes while exhibiting a first-order lag characteristic with respect to the basic intake gas amount GGAScyl_b according to a relation calculated by the above-described first-order lag filtering arithmetic expression (4).

Then, when a relation of GGAScyl≥GAIRcmd is established at the time t31 in accordance with the progress of the control, the EGR execution condition flag F_EGRair is set to "1" and the EGR control process is started.

That is, since the target EGR amount GEGRcmd is set to a value corresponding to the operation state from the value 0, the EGR valve 5b is controlled to be opened. At the same time, the target differential pressure valve opening degree LPTHcmd is set to generate a differential pressure between the upstream side and the downstream side of the EGR valve 5b and the differential pressure generating valve opening degree LPTH is controlled to change from the maximal opening degree LPTHwot toward the target differential pressure valve opening degree LPTHcmd.

In accordance with a decrease in differential pressure generating valve opening degree LPTH at the time of executing the EGR control, the basic intake gas amount GGAScyl_b decreases, and a state of GGAScyl_b<GAIRcmd occurs after the time t32. Since the intake gas amount GGAScyl exhibits a first-order lag characteristic with respect to the basic intake gas amount GGAScyl_b as described above, the intake gas amount GGAScyl is in a state of not changing to be smaller than the target fresh air amount GAIRcmd. As a result, it is possible to avoid the occurrence of the hunting.

As described above, according to the control device of the second embodiment, since the basic intake gas amount GGAScyl_b is calculated in response to the boost pressure P3 and the intake gas amount GGAScyl is calculated by executing a first-order lag filtering arithmetic process for the basic intake gas amount GGAScyl_b, the intake gas amount GGAScyl is calculated while exhibiting a response delay characteristic with respect to a real value. Accordingly, even when the amount of the air actually flowing inside the intake passage 4 decreases with the start of the control of the differential pressure generating valve 6a, it takes time to reflect the decrease state for the calculation result of the intake gas amount GGAScyl. As a result, even when the amount of the air actually flowing inside the intake passage 4 decreases with the start of the control of the differential pressure generating valve 6a after the intake gas amount GGAScyl reaches the target fresh air amount GAIRcmd, it is possible to prevent a problem in which the calculation result of the intake gas amount GGAScyl is smaller than the target fresh air amount GAIRcmd and to avoid the occurrence of the hunting. Accordingly, it is possible to improve the merchantability.

Additionally, the second embodiment is an example in which the basic intake gas amount GGAScyl_b is calculated in response to the boost pressure P3 corresponding to the operation state of the engine 3, but a method of calculating the basic intake gas amount of the invention is not limited thereto. The basic intake gas amount may be calculated in response to the operation state of the internal-combustion engine. For example, the basic intake gas amount may be calculated in response to the engine rotation speed NE or the request torque TRQ.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device of internal-combustion engine, the internal-combustion engine including a boost device and an EGR device, the control device comprising:
   a processor, configured to execute programs to function as an intake gas amount acquiring unit, a target fresh air amount setting unit, a boost control unit, and an exhaust gas recirculation (EGR) control unit, wherein the intake gas amount acquiring unit acquires an amount of a gas flowing into a cylinder of the internal-combustion engine as an intake gas amount, wherein the target fresh air amount setting unit sets a target fresh air amount as a target for an in-cylinder fresh air amount which is an amount of fresh air flowing into the cylinder of the internal-combustion engine, wherein the boost control unit which controls a boost operation of the boost device when an operating range of the internal-combustion engine is in a predetermined boost range, wherein the boost device includes a compressor which is provided in an intake passage of the internal-combustion engine and a turbine which is provided in an exhaust passage of the internal-combustion engine, wherein the EGR device includes an EGR passage which is connected between a downstream portion in relation to the turbine of the exhaust passage and an upstream portion in relation to the compressor of the intake passage, an EGR valve which changes an amount of a recirculation gas flowing inside the EGR passage, and a differential pressure generating valve which is provided at an upstream side in relation to a connection portion between the intake passage and the EGR passage and generates a differential pressure between upstream and downstream sides of the EGR valve, wherein when the intake gas amount reaches the target fresh air amount, the EGR control unit controls the EGR valve so that the recirculation gas flows inside the EGR passage and controls the differential pressure generating valve such that a differential pressure is generated, wherein the EGR control unit controls the EGR device to stop exhaust gas recirculation when the intake gas amount does not reach the target fresh air amount, wherein when the exhaust gas recirculation is stopped, the EGR control unit controls an opening degree of the differential pressure generating valve such that the opening degree becomes a maximal opening degree in which a differential pressure is not generated until the operating range of the internal-combustion engine is in the predetermined boost range and the intake gas amount reaches the target fresh air amount, wherein after the EGR device stops the exhaust gas recirculation, the EGR control unit controls the EGR device to execute the exhaust gas recirculation when the intake gas amount reaches the target fresh air amount in a case where the operating range of the internal-combustion engine is in the predetermined boost range.

2. The control device of the internal-combustion engine according to claim 1, wherein the target fresh air amount setting unit sets a basic target fresh air amount and an upper-limit target fresh air amount larger than the basic target fresh air amount by a predetermined value as the target fresh air amount, wherein the EGR control unit controls the EGR device so that the exhaust gas recirculation is stopped until the intake gas amount reaches the upper-limit target fresh air amount and the exhaust gas recirculation is executed after the intake gas amount reaches the upper-limit target fresh air amount when the operating range of the internal-combustion engine is in the predetermined boost range, and wherein the predetermined value is set to a value in which the intake gas amount does not become smaller than the basic target fresh air amount when the control of the differential pressure generating valve is executed.

3. The control device of the internal-combustion engine according to claim 1, wherein the intake gas amount acquiring unit calculates a basic intake gas amount in response to the operation state of the internal-combustion engine and calculates the intake gas amount by executing a filtering process giving a predetermined response delay characteristic for the basic intake gas amount.

* * * * *